Aug. 27, 1963  C. O. VAUGHN  3,101,897
CONTROL FOR BURNERS
Filed Dec. 29, 1960  3 Sheets-Sheet 2
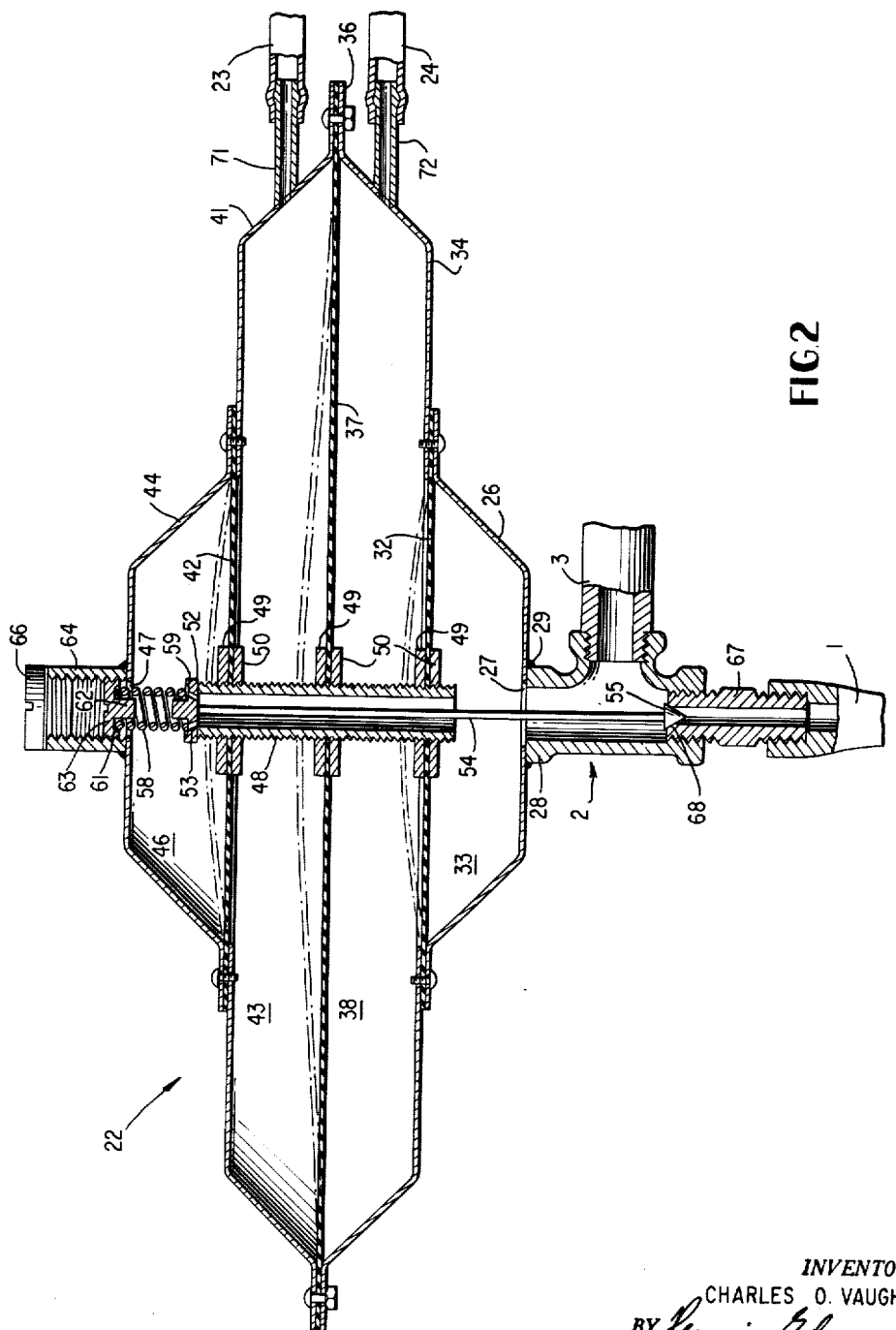
INVENTOR.
CHARLES O. VAUGHN
BY
ATTORNEYS

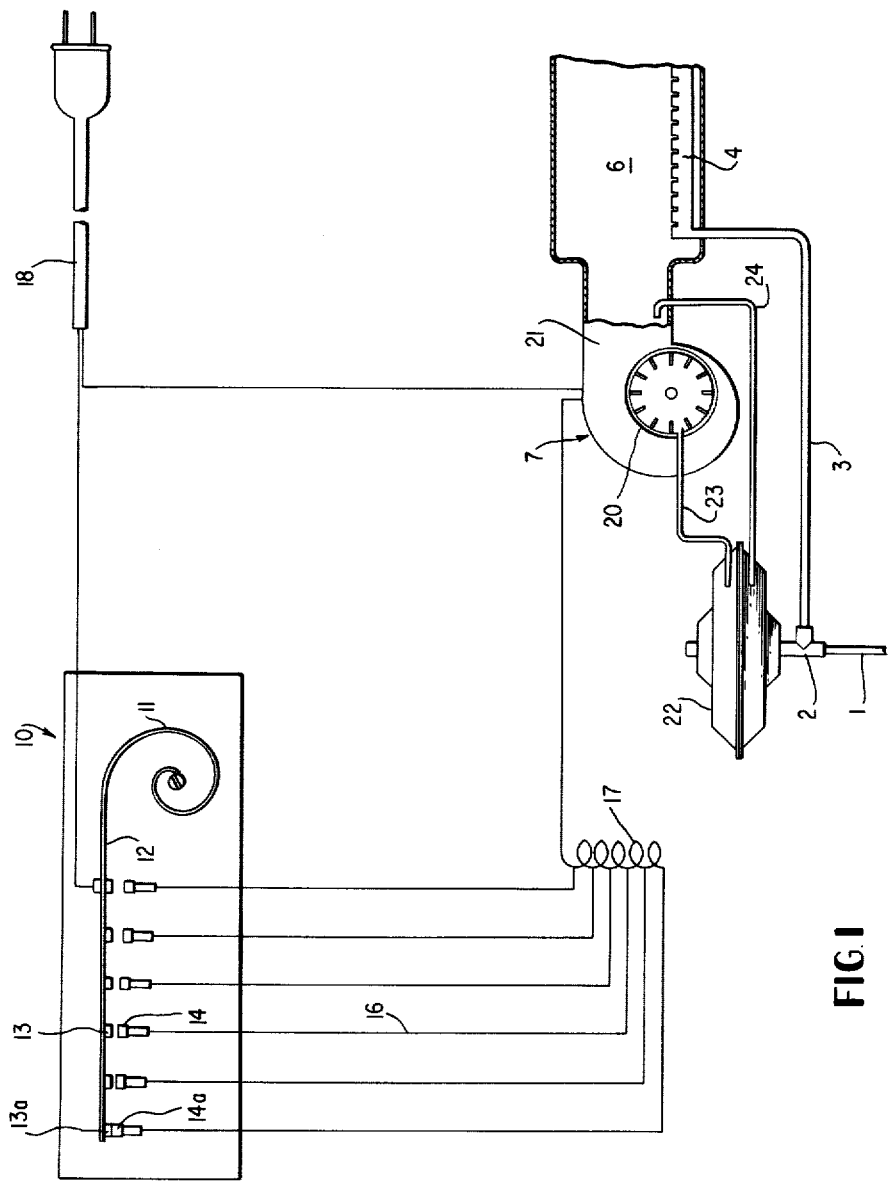

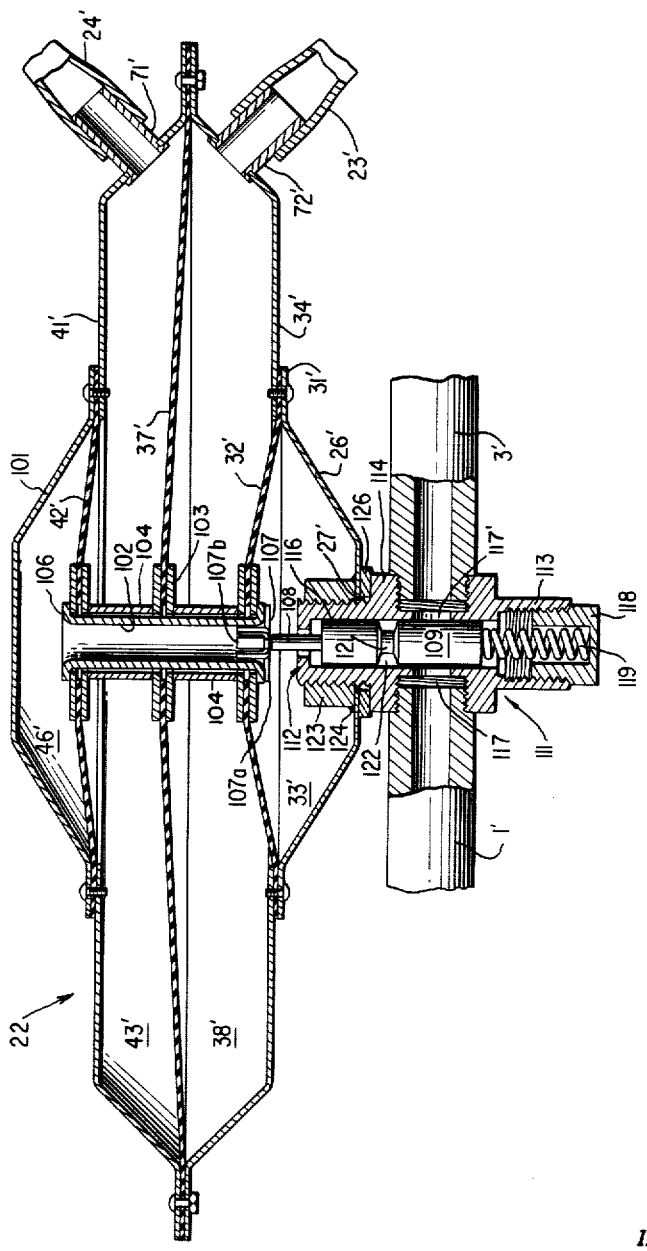

United States Patent Office 3,101,897
Patented Aug. 27, 1963

3,101,897
CONTROL FOR BURNERS
Charles O. Vaughn, Dayton, Tenn., assignor to Suburban Appliance Company, Dayton, Tenn., a corporation of Tennessee
Filed Dec. 29, 1960, Ser. No. 79,266
5 Claims. (Cl. 236—1)

The present invention relates to a control for burners and more particularly to a control including a pressure-responsive fuel regulating device that is both accurate and responsive to slight changes in pressure.

The present invention finds particular use in space heaters of the type disclosed in my Patent No. 2,864,359 and will be described in connection with space heaters of that type. However, the regulating device is of general usage in that it may be used to regulate the flow of any fluid, either gas or liquid, in any type of system where a blower-produced fluctuating pressure is available as a control for the fuel regulator.

One of the major safety problems of fuel burners is to assure that the air blower is on when the fuel is burning. If the blower is not on, the burner may overheat presenting a serious hazard to both the apparatus and its surroundings. Safety mechanisms have been devised to allow fuel to flow to the burner only when the blower is on. Such mechanisms frequently are relatively complex. One type of such mechanism utilizes the change in air pressure from atmospheric pressure at the blower when the blower is on to control the flow of fuel. Since many of these mechanisms have to cope with the substantial frictional resistance of the packing gland through which the valve stem of the fuel-regulating valve reciprocates when the valve is moving towards the open or closed position, they are relatively slow-acting and unresponsive to small pressure changes at the blower. That is, they provide no regulation of fuel flow until the change in air pressure at the blower has exceeded that necessary to overcome the frictional resistance of the packing gland. This may require the use of another auxiliary fuel regulator if a variation in fuel flow at relatively low pressure changes is desired.

The present invention provides a simple, safe mechanism that is responsive to even minute changes in air pressure at the blower for regulating the flow of fuel.

In the control of the present invention, the speed of the blower is controlled by a thermostat which responds to changes in the temperature of the ambient atmosphere. As the speed of the blower increases, the pressure differential between the intake and the exhaust of the blower also increases. This increase in the pressure differential is made effective on the regulator or metering device of the present invention to increase fuel flow to the fuel burners. In other words, the pressure of the air flowing to the burners controls, in direct proportion, the amount of fuel supplied to the burners. Therefore, it is only when the blower is operating that fuel will flow to the burners, thus assuring a safe device.

A particularly important feature of the invention is that the regulation of the valve is wholly independent of any variation in the pressure of the fuel flowing to the burner, that is, the regulation of the valve is solely dependent upon the flow of air to the burner, since the fuel pressure exerted on one side of the regulator or metering device is counter-balanced by shunting fuel to the opposite side of the regulator to exert an equal pressure on the opposite side.

The invention will be further described with reference to the accompaying drawing in which:

FIG. 1 is a schematic drawing of the control for burners,

FIG. 2 is a view in section of one form of the regulating device, showing in full lines the position of the diaphragm when the control valve is closed, and in dotted lines, the position of the diaphragms when the valve is open, and FIG. 3 is a view in section of another form of the regulating device.

While the regulator is described below as regulating the flow of fuel in response to the air pressure at the blower, it may, of course, regulate the flow of any fluid medium in response to any change in pressure.

In order to relate the various elements of the invention to various elements of the burner of the space heater of the forsaid patent, the space heater disclosed in that patent will first be described in general terms. It has a blower of a number of sections, one of which propels outside air through a fire box or combustion chamber for combustion with the fuel, with the resulting hot combustion gases flowing into a tortuous path of a heat exchanger. Another section of the blower propels air from the room to be heated through an adjacent tortuous path of the heat exchanger where it is indirectly heated by the combustion gases. The cooled combustion gases are expelled from the heat exchanger to the outside while the warmed room air flows back into the room, heating it.

Referring now to FIG. 1, fuel is supplied from a fuel supply line 1 through a valve 2 and a fuel line 3 to a bank of fuel burners 4 located in the fire box or combustion chamber 6 of the space heater. Outside air is impelled by a blower 7 into and through the fire box. The speed of the blower, and thus of the air being impelled by it into and through the fire box, is controlled by a thermostat 10, located in the room to be heated by the space heater. The thermostat 10 comprises a conventional coiled bi-metallic thermostatic element 11 having an elongated end 12 carrying a plurality of contacts 13 spaced along its length. Adjacent to each of the contacts 13 is a corresponding one of contacts 14, which are electrically connected through wires 16 to a corresponding tap point of a tapped reactor 17. As the temperature of the room decreases, thermostatic element 11 tends to coil itself more tightly swinging the extended arm 12 downwardly, as shown in FIG. 1, causing one after another of contacts 13 to engage contacts 14. When the first contact 13a engages contact 14a, electrical energy is supplied from electric power line 18 through the elongated end 12 of the thermostatic element and through contacts 13a and 14a and reactor 17 to the blower 7 to energize the blower causing it to force air through the fire box 6.

Power line 18 typically will be connected to the conventional 115 volt 60-cycle power outlet existing in most homes today. As the temperature of the room in which the space heater is located continues to drop, and thermostatic element 11 coils itself more tightly, the contacts 13 and 14 will close progressively cutting out more and more of the reactor 17 in the power supply circuit of the blower 7 as contacts 13 are connected one after another to the tap points of reactor 17. As more and more of the reactor 17 is cut out of the power supply circuit of the blower, progressively greater amounts of power will be supplied to the blower causing the speed of the blower progressively to increase, thereby increasing the amount of air flowing through it and, therefore, through combustion chamber 6. This causes the air pressure at inlet 20 of the blower to decrease and at outlet 21 of the blower to increase.

The decreasing or negative air pressure existing at inlet 20 is transmitted to one section of a regulator 22 through a Pitot tube 23; while the increasing or positive air pressure existing at outlet 21 is transmitted to another section of the regulator through a Pitot tube 24. The full pressure differential between inlet 20 and outlet 21 of the blower is sensed by the regulator through Pitot tubes 23 and 24 and is used to control the adjustment of valve 2 to thereby regulate the fuel flowing through valve 2 and line 3 to the bank of fuel burners 4.

While the thermostatic element 11 has been shown and described as of the bi-metallic type, alternatively it may be of the bellows type, for example. Also, the tapped reactor may be a variable reactor, or a tapped or variable resistor, or any of numerous other variable impedance devices, for example. Any voltage regulation device capable of being controlled by thermostatic element 11 will suffice.

The regulator 22 is shown more fully in FIG. 2. In this figure the diaphragms are shown in full lines in the position they assume when the blower is not operating and in which position they maintain the valve 2 closed, completely obstructing the flow of fuel from fuel supply line 1 to the bank of fuel burners 4. The dotted lines indicate, in general, the position the diaphragms assume when the blower is operating and in which position valve 2 is open, permitting fuel to pass to the fuel burners.

The lower portion of the housing of the regulator comprises a lower metallic pan-like member 26 having an opening 27 in the center of its bottom communicating with an upper extension 28 of the T-member forming the housing of the valve 2. The edge of pan 26 surrounding the opening 27 is secured to the T-member housing of the valve in any suitable manner, as by a weld 29. The outer edge 31 of the pan is secured to the outer edge of a fluid-impervious flexible diaphragm 32, with which the pan 26 defines a chamber or compartment 33. The outer edge of pan 26 and the outer edge of the diaphragm 32 are connected with a fluid tight connection to the inner periphery of a metallic annular member 34, having an outer portion flared outwardly and upwardly, as viewed in FIG. 2, which terminates in an outwardly extending peripherial flange 36. This flange is secured to the outer edge of a fluid-impervious, flexible diaphragm 37, with which annular member 34 and diaphragm 32 define a chamber 38. The outer edge of annular member 34 and the outer edge of diaphragm 37 are connected with a fluid tight connection to the outer edge of a metallic annular member 41, similar in shape to the annular member 34 but inverted in placement. This inner periphery of annular member 41 is secured to the outer edge of a fluid-impervious, flexible diaphragm 42, with which the annular member 41 and diaphragm 37 define a chamber 43. The inner periphery of the annular member 41 and the outer edge of the diaphragm 42 are connected with a fluid-tight connection to the outer edge of a metallic pan-like member 44, similar in shape to pan 26, but inverted. Pan 44 and diaphragm 42 define a chamber 46. The pan 44 has a centrally located opening 47 in its top similar to opening 27 in pan 26.

Passing through a centrally located opening in each of the diaphragms 32, 37 and 42, is an externally threaded pipe 48. Upper and lower nuts 49 and 50 are threaded onto the pipe and tightly clamp the inner periphery of the respective diaphragms, thereby holding the inner edges of the diaphragms in a predetermined position with respect to the pipe and also preventing fluid from seeping around the inner edges of the diaphragms from one chamber to another. On the end of the pipe in chamber 46 rests the outer boundary of a disc 52 having openings 53 passing therethrough which permit fluid to pass between chamber 46 and the interior of the pipe. A valve stem 54 of the fuel control valve is connected, at one end, to the inner side of the disc and, at the other end, terminates in a valve head 55. The outer side of the disc 52 has a centrally located protrusion 57 positioning a compression spring 58, one end of which is seated in a recess 59 and bears against the disc. The other end of the spring is positioned in a recess 61 by a similar protrusion 62 of an adjusting member 63 having a threaded periphery which engages the threads of an internally-threaded nipple 64 secured in any suitable manner, as by welding, to the pan 44 about the edge of the opening 47. A closure plug 66 is threaded into the upper end of the nipple 54 to prevent any foreign matter from entering and clogging the interior of the nipple. This plug is readily removable to permit adjustment of the longitudinal position of the adjusting member within the nipple to vary the compression of the spring 58 and the resultant force it exerts on the disc 52 to overcome the pressure exerted by the fuel in the supply line 1 on the valve head 55 and on the valve stem 54. The compression of the spring 58 also may be varied to compensate for the variation in pressures existing in different fuel lines from time to time in different localities, which pressure is exerted on the valve head and the valve stem.

The stem of the T-shaped valve housing is connected to one end of the fuel line 3 to conduct the fuel passing through the valve to the fuel burners while the end of the valve housing opposite the end which is attached to pan 26 is internally threaded and receives one end of a nipple 67. The fuel supply line 1 is screwed on to the other end of the nipple. The inner end of the bore of the nipple 67 is flared outwardly to form a valve seat 68 for the control valve head 55 which, when the device is inoperative, closes the valve and obstructs the flow of fuel from the supply line through the nipple. The valve stem 54, connected to the valve head, passes through the opening in the opposite end of the T-shaped valve housing, into the regulator 22 and through the interior of the pipe 48 to disc 52, to which it is connected. The length of the valve stem is such that when the diaphragms are in their normal inoperative position as shown in full lines in FIG. 2, the compression spring 58 is compressed sufficiently to exert enough force on the disc, valve stem, and valve head to overcome the force of the fuel pressure on the valve head and hold the valve head in fluid-tight engagement against the valve seat.

The Pitot tubes 23 and 24 are connected to chambers 43 and 38, respectively, by short pipes 71 and 72 extending from the side walls of the annular members 41 and 34 respectively. Thus, the pressure at the blower inlet is transmitted to chamber 43 through Pitot tube 23 while the pressure at the blower outlet is transmitted to chamber 38 through Pitot tube 24.

From the foregoing description of the regulator it will be noted that the pressure in chambers 33 and 46 will always be equal due to the connecting fluid passageway between them through the interior of pipe 48 and openings 53 in disc 52. Since diaphragms 32 and 42 are of the same size and material, and thus have equal areas and are equally distensible when subject to equal pressure differentials, the pressure in chamber 33 on diaphragm 32 tending to move the pipe 48 outwardly and open the valve is exactly offset by the pressure in chamber 46 on diaphragm 42 tending to move the pipe 48 inwardly and close the valve. Thus the pressure in chambers 33 and 46 has no net effect on the adjustment of the valve. When the blower is not operating, the ambient pressures in the Pitot tubes 23 and 24 and in chambers 43 and 38 will also be equal and therefore will exert no net pressure on the diaphragms tending to move the pipe 48 either inwardly or outwardly. In this state, compression spring 58 holds the valve head against the valve seat and the valve is closed permitting no fuel to flow to the burners.

When the blower is operating, the blower inlet pressure in Pitot tube 23 and in chamber 43 will decrease, while the blower outlet pressure in Pitot tube 24 and in chamber 38 will increase. This difference in pressure in chambers 43 and 38 tends to distend their separating diaphragm 37 outwardly to move pipe 48 outwardly opening the valve. While it is true that the pressure in chamber 46, being greater than the decreased pressure in chamber 43, will tend to distend diaphragm 42 inwardly to move the pipe 48 towards the valve, and the increased pressure in chamber 38 will tend to distend diaphragm 32 to move the pipe towards the valve, since diaphragm 37 is larger than diaphragms 32 and 42, the force executed by diaphragm 37 on the pipe overcomes the force exerted by diaphragms 32 and 42 on the pipe and urges the pipe and diaphragms outwardly to the dotted line position shown in FIG. 2 opening the valve. As the blower speed increases, the pressure differential between the blower inlet and outlet, and between chambers 43 and 38, will increase causing pipe 48 to move outwardly even farther and the valve head 55 to move even farther from the valve seat 68 to open the valve to a greater extent.

In operation, as the temperature of the room drops, the coil of the bi-metallic thermostat element 11 tightens, causing contact 13a at the end of arm 12 to engage contact 14a of the tapped reactor, completing the circuit through reactor 17 to blower 7 and energizing it. Before the blower is energized, in other words, when the space heater is not operating, the air pressures at the inlet and outlet of the blower, and in chambers 43 and 38, are at ambient pressure. Thus, valve 2 is closed and no fuel is supplied to burner 4. When blower 7 is energized, by the engagement of contacts 13a and 14a, the air pressure at the inlet 20 of the blower and in chamber 43 decreases, while the air pressure at the outlet 21 of the blower and in chamber 38 increases, causing the diaphragms of the regulator to distend outwardly to the dotted line position shown in FIG. 2 moving pipe 48 outwardly. The outward movement of the pipe moves the disc 52 outwardly towards upper pan 44 against the expansive force of spring 58 and raises the valve stem 54 connected to the disc. This lifts the valve head 55 from its seat 68 opening valve 2 to permit fluid from line 1 to pass through the valve and fuel line 3 to the bank of fuel burners 4. It also permits the fuel from the downstream side of the valve to pass through opening 27 to enter chamber 33 and, by passing through the pipe 48 and openings 53 of the disc, to enter chamber 46, these chambers being in direct fluid communication with the downstream side of the valve and the outlet port of the valve. Because the fuel downstream pressure exerted in chamber 33 on the inner side diaphragm 32 is the same as the fuel pressure exerted in chamber 46, on the outer side of diaphragm 42, no net force is exerted by the fuel pressure on the diaphragms to move pipe 48 to alter the position of the valve head 55, with respect to the valve seat 68 to change the adjustment of the valve. Hence, the only force affecting the distention of the diaphragms and the adjustment of the valve is the force exerted on diaphragm 37 due to the difference in blower inlet and outlet pressures as reflected in the air pressures in chambers 43 and 38.

Should the temperature of the room continue to drop, thermostatic element 11 will coil still more tightly, closing additional contacts 13 and 14 to cut out more and more of reactor 17 in the power supply of the blower, resulting in a greater amount of power being supplied to the blower to cause its speed to progressively increase. As the speed progressively increases, the air pressure at its inlet progressively decreases and the air pressure at its outlet progressively increases. This increasing difference in air pressures is transmitted to the respective chambers 43 and 38 through Pitot tubes 23 and 24 and causes the diaphragms to distend even more, progressively lifting the pipe 48 and disc 52 against the force exerted by spring 58. The progressive lifting of the disc 52 progressively lifts the valve head 55 from the valve seat 68 and progressively allows more fuel to flow through the valve housing 2 and fuel line 3 to the bank of fuel burners for combustion to further heat the room air. This increased flow of fuel increases the fuel pressure in the downstream portion of the valve housing 2 and thus the pressures in chambers 33 and 46. However, since these pressures are balanced, no net force is exerted on pipe 48 and disc 52 to alter the adjustment of the valve. For this reason, pressure of the fluid flowing through the fuel supply line to the fuel burners has no effect whatever on the control of the volume of fluid flowing therethrough.

As the room air is heated and the temperature of the room rises, the thermostatic element 11 will uncoil, opening one after another of contacts 13 and 14 to decrease the power supplied to the blower through the reactor 17 and thus the speed of the blower. This decreases the difference in air pressure between the inlet and outlet of the blower and in chambers 43 and 38 which, in turn, decreases the force diaphragm 37 exerts on pipe 48 and disc 52, allowing spring 58 to force the valve head 55 towards its seat 68 and decrease the flow of fuel to the burners. When the room temperature finally rises to a degree such that the thermostatic element opens all of contacts 13 and 14, no power will be supplied to the blower and it will stop. The air pressures in chambers 43 and 38 will equalize allowing the diaphragms and pipe 48 to return to their full line positions and allowing compression spring 58 to urge the valve stem and head inwardly against the valve seat to close the valve stopping the flow of fuel. Thus, the heating system returns to its inoperative state.

Referring now to FIG. 3, the fuel regulator shown therein is generally similar in construction and operation to the regulator shown in FIG. 2 and described above. The metallic pan-like member 26', the metallic annular members 34' and 41' and the fluid-impervious flexible diaphragms 32', 37' and 42' are identical to those shown in FIG. 2. The metallic pan-like member 101 is identical to the member 44' of FIG. 2, except that it has no centrally located opening drilled therein. These various members and diaphragms define chambers 33', 38', 43' and 45', as they do in FIG. 2.

A pipe 102 passes through the centrally located openings in each of the diaphragms to allow the fluid in chamber 33' to communicate therethrough with the fluid in chamber 46'. On both sides of the centrally located openings in each of the diaphragms 32', 37' and 42' is a washer 103 surrounding the pipe. Surrounding the portion of the pipe within chamber 38' is a cylindrical spacer 104 which serve to separate and position washers 103 within the chamber. A similar cylindrical spacer is provided in chamber 43'. These various spacers and washers maintain the diaphragms in predetermined positions after the ends of the pipe 102 have been flared outwardly to lie at approximately right angles to the axis of the pipe, providing an enlarged flange 106 at both ends of the pipe, to retain and compress the various washers and spacers surrounding the pipe, thereby fluidly sealing the opening in each diaphragm. Thus, chambers 38' and 43' are fluidly sealed from one another and from chambers 33' and 46'.

Located on the outwardly flared lower end of the pipe 102, within chamber 33', is a spider member 107 providing a surface on which a valve stem 108 attached to a valve head 109 of the valve bears. The spider member 107 is a disc, of smaller diameter than the inner diameter of pipe 102, with a plurality equally-spaced radially-protruding leg portions 107a and equally-spaced long leg portions 107b. When the spider member is on the end of the pipe 102, the leg portions 107a bear on the outwardly turned flange 106 and the leg portions 107b bear against the inside wall of the pipe and hold the spider member against the end of the pipe. The spaces between the legs 107a and 107b provide passages for the flow of fluid past the spider member when it is on the end of the pipe.

Valve housing 111 is generally cylindrical in shape. Both end portions 112 and 113 are reduced in diameter to approximately one half the diameter of the body portion 114 of the housing. The upper portion 112 of the valve housing, within chambers 33', is externally threaded. Passing longitudinally through the center of the housing along its axis is a longitudinal bore 116 in which reciprocates the valve head 109, a piston-type valve head. The bore 116, where it passes through the outer end of the upper portion 112 is of a diameter only slightly greater than valve stem 108 so that, when valve head 109 moves towards the end of the upper portion 112, it is held against movement out of the valve housing 111 by the shoulder provided by the reduction in diameter of the opening. Directly opposite one another and passing radially into body portion 114 of the valve housing to the bore 116 are inlet and outlet ports or openings 117 and 117' respectively, into which are threaded the fuel supply line 1' and the fuel line 3' respectively. The portion of the inlet and outlet openings 117 and 117' adjacent the bore 116 is reduced to a diameter approximately equal to that of the fuel lines 1' and 3'. The shoulder provided by this reduction in diameter will, if necessary, prevent the fuel lines 1' and 3' from being threaded so far into inlet and outlet openings 117 and 117' as to bear against valve head 109 and impede its movement. Longitudinal bore 116 at its lower end 113, is enlarged in diameter and internally threaded to receive a hollow cap plug 118. Between the inside surface of cap plug 118 and the opposed end of valve head 109 is positioned a compression spring 119, which serves to bias the valve head to its closed position. The valve head 109 has a portion 121 of reduced diameter at a position approximately midway of its length. The longitudinal width of this reduced portion is approximately one half to two thirds that of the reduced diameter of inlet and outlet openings 117 and 117' immediately adjacent the bore 116, so that a space 122 between the reduced portion 121 and the bore 116 is provided which, when moved to lie within the path of the inlet opening 117, allows fuel from fuel supply line 1' to flow therethrough to the outlet opening 117' and into the fuel line 3' leading to the burners. As the portion of space 122 opposite the inlet opening 117 progressively increases, progressively greater amounts of fuel will flow past the valve head through the outlet opening 117' and into the fuel line 3'.

It has been found desirable to provide some bypass of fuel past the valve head 109 into the fuel line 3'. To this end, both the upper and lower portions of the valve head are of a diameter approximately three-thousandths of an inch less than the diameter of bore 116. This also provides a space for the desired passage of fuel past the valve head 109 and valve stem 108 into chamber 33' and past the spider member 107 and through pipe 102 to chamber 46'. Due to this bypass of fuel, the pressure in chambers 33' and 46' will be the same as that in the fuel supply line 1'. Also due to this bypass, the valve head is free to travel within the bore 116 without any frictional resistance.

A nut 123 is positioned within chamber 33' about opening 27' of pan member 26', by spot welds 124. The threaded upper end 112 of the valve housing is threaded through the opening 27' and into the nut 123 to hold the valve housing to the pan member 26'. A felt washer 126 is positioned between pan member 26' and the shoulder of the valve housing 111 adjacent the reduced upper end portion 112 of the valve housing so that, when the threaded end 112 is completely threaded into nut 123, sufficient pressure will be exerted by the shoulder of the valve housing against the felt washer 126 to seal the space between the valve housing and pan member 26', preventing any fluid leakage therepast.

In this embodiment of the regulator, the blower inlet Pitot tube 23' is connected to pipe 72' located in the side of annular member 34' and the blower outlet Pitot tube 24' is connected to pipe 71' located in the side of annular member 41'. Thus, when the blower is operating, the pressure in chamber 38' will be reduced and the pressure in chamber 43' will be increased to exert a net pressure on diaphragm 37' to move pipe 102 towards the valve housing.

As will readily be seen, the regulator of this embodiment may easily be assembled by separately assembling the diaphragms and pipe within annular members 34' and 41' and pan member 101, and the valve housing 111 to the pan member 26', and then attaching pan member 26' to annular member 34', which is possible since the short valve stem 108 is not attached to the spider member 107 but only bears against the spider member.

When the blower is energized by the thermostat, the pressure exerted by diaphragm 37' on pipe 102, due to the increased blower outlet pressure in chamber 43' and the decreased blower inlet pressure in chamber 38', moves valve head 109 against the compressive force of spring 119. When the blower has reached a certain minimum speed the pressure exerted by diaphragm 37' on pipe 102 will be sufficient to move valve head 109 against the force exerted by the compression spring 119 a sufficient distance to position the reduced portion 121 of the valve head opposite the inlet and outlet openings 117 and 117' and permit fuel to pass readily from the fuel supply line 1' through the space 122 to the fuel line 3'. A regulation of this flow of fuel is provided by varying the extent to which the space 122 is positioned opposite the inlet and outlet openings. This is the result of the speed of the blower causing a variation in the pressures in chambers 38' and 43', and thus a variation in the pressure exerted by diaphragm 37' on pipe 102, the valve head 109 and the spring 119. The range of blower speeds in which this variation occurs can be controlled and adjusted by adjusting the position of cap plug 118 within opening 116 to vary the force exerted by compression spring 119 on the bottom of the valve head.

As the diaphragms 32', 37' and 42' and pipe 102 move back and forth in response to variations in the blower speed, the volume of chambers 33' and 46' will change. If this change in volume was not compensated for, a net pressure tending to offset the pressure caused by the variation in blower speed would be exerted by the fluid in these chambers on respective diaphragms 32' and 42' and tend to counteract the regulation of the flow of fuel. However, the combined volume of these two chambers always is constant. Thus, due to the passageways past spider member 107, the fluid in one chamber may flow into the other chamber as the diaphragms and pipe move back and forth in regulating the adjustment of the valve and no net pressure is exerted on diaphragms 32' or 42' to offset or counteract this regulation of the valve.

From the foregoing it will be seen that the invention provides a safe and responsive control for burners utilizing a blower-pressure-responsive fuel-regulating device. As the speed of the blower increases, the difference in the air pressure existing between the inlet and the outlet of the blower increases, thereby causing the regulator to increase the valve opening to supply more fuel to the bank of fuel burners. This is a direct result of more air being supplied to the combustion chambers by the blower which in turn is directly related to the condition of the thermostat reflecting the temperature of the room.

It will also be seen that the fuel is allowed to flow out about the valve rod and into the regulator. This does not impair or vary the adjustment of the regulator, since the fuel pressure is exerted on opposite sides of the regulator to provide a balanced force which has no net effect on the regulator. As a result of the absence of any sealing means about the valve rod, and thus of the absence of any restrictive frictional force against movement of the valve rod which must be overcome before any regulation of the valve can be obtained, the regulator affords a highly sensitive means for controlling the supply of fuel to the burners.

It is to be understood that various changes within the skill of the art may be made in the details of the control means herein described without departing from the inven-

I claim:

1. A regulating control for a fluid medium which comprises a valve having an inlet port and an outlet port for a fluid medium, a housing, four axially aligned chambers in the housing separated at least in part by pressure-deformable, impervious, flexible walls, means attached to the impervious and flexible walls to maintain a predetermined relative position of the walls with respect to one another, means to equalize fluid pressure in one of the valve ports with the fluid pressure in the two outer chambers of the housing, the outermost flexible walls being in direct fluid communication with said one valve port and subject directly to fluid pressure in said one valve port, said outermost flexible walls being equally distensible when subject to equal pressure differentials, a variable speed blower having an inlet and an outlet, means for varying the speed of the blower and thereby varying the pressure at the inlet and outlet, means for transmitting the negative pressure at the inlet to one of the inner chambers, and means for transmitting the positive pressure at the outlet to the other of the inner chambers, whereby pressure within the inner chambers may be oppositely varied to deform the impervious and flexible walls thereof.

2. In a regulating control as set forth in claim 1, a source of power for driving said blower, a variable impedance means connected to the blower and temperature responsive means for varying the impedance of the impedance means, to vary the power supplied to the blower and thus the speed of the blower and the pressures within the two chambers.

3. A regulating control for a fluid medium which comprises a valve having an inlet port and an outlet port for fluid, a housing, three interior, substantially parallel, impervious flexible walls within the housing dividing the housing into four chambers, one of the outer chambers being in direct fluid communication with one of the ports of the valve, a pipe connected to the two outer chambers and providing a fluid passageway between those chambers, a variable speed blower having an inlet and an outlet, means for varying the speed of the blower and thereby varying the pressure at its inlet and outlet, means for transmitting the negative pressure at the inlet to one of said inner chambers and means for transmitting the positive pressure at the outlet to the other of said inner chambers, and means responsive to the deformation of the impervious, flexible wall separating the two inner chambers to control the flow of fluid through the valve.

4. A regulating control as set forth in claim 3, in which the means for varying the speed of the blower comprises a thermostatic element, an elongated arm connected to one end of the thermostatic element, a plurality of contacts on said arm, means for connecting a source of power to said contacts, a second plurality of cooperating contacts so positioned in the path of movement of said arm that one after another thereof will come into contact with an associated contact on the arm as said arm moves, impedance means having a plurality of tapped points each individually connected to a different one of the second plurality of contacts, and means connecting said impedance means to said blower, whereby as the temperature decreases the thermostatic element moves the arm to cause one after another of the cooperating contacts to engage to progressively supply more power through the impedance means to the blower.

5. A burner system comprising a burner for fluid fuel, a conduit for supplying fuel from a source of fluid fuel to said burner, an adjustable valve in said conduit for controlling the flow of fuel through said conduit to said burner, a blower for supplying air to said burner, said blower having an outlet conduit communicating with said burner, regulating means in direct fluid communication with the fuel flowing through said valve and responsive solely to said flow of air to the burner for controlling the flow of fuel through said valve to said burner, said regulating means comprising a housing, three interior, substantially parallel, flexible walls within the housing dividing the housing into four chambers, said chambers comprising a pair of outer chambers and a pair of interposed inner chambers, one of the outer chambers being in direct fluid communication with the fuel flowing through said valve, a pipe connected to the two outer chambers and providing a fluid passageway between said chambers, means for transmitting the pressure at the inlet of said blower to one of the inner chambers, means for transmitting the pressure at the outlet of said blower to the other of the inner chambers, which pressures vary oppositely, to deform the flexible wall separating the two inner chambers, and means responsive to the deformation of said last-named flexible wall to control the flow of fluid through the valve.

References Cited in the file of this patent

UNITED STATES PATENTS

| | | |
|---|---|---|
| 1,853,863 | Hornbruch | Apr. 12, 1932 |
| 2,502,345 | Ryder | Mar. 28, 1950 |
| 2,507,119 | Randall et al. | May 9, 1950 |
| 2,705,046 | Schroeder | Mar. 29, 1955 |
| 2,811,166 | Collins et al. | Oct. 29, 1957 |
| 2,867,268 | Brown | Jan. 6, 1959 |

UNITED STATES PATENT OFFICE
CERTIFICATE OF CORRECTION

Patent No. 3,101,897                August 27, 1963

Charles O. Vaughn

It is hereby certified that error appears in the above numbered patent requiring correction and that the said Letters Patent should read as corrected below.

Column 1, line 69, for "accompaying" read -- accompanying --; column 2, line 2, for "diaphragm" read -- diaphragms --; column 5, line 44, for "fuel downstream" read -- downstream fuel --; line 67, after "lifting" strike out the period --; column 6, line 45, for "serve" read -- serves --; line 75, for "chambers" read -- chamber --; column 9, line 28, strike out "a".

Signed and sealed this 14th day of April 1964.

(SEAL)
Attest:

ERNEST W. SWIDER

Attesting Officer

EDWARD J. BRENNER

Commissioner of Patents